May 29, 1928.
S. J. SWANSON
ROTARY AMUSEMENT DEVICE
1,671,329
Filed June 11, 1926
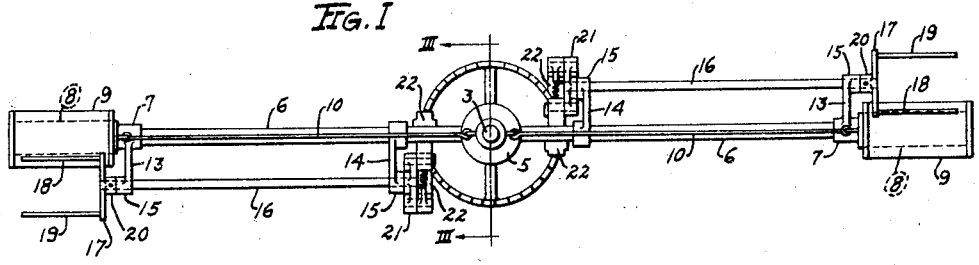
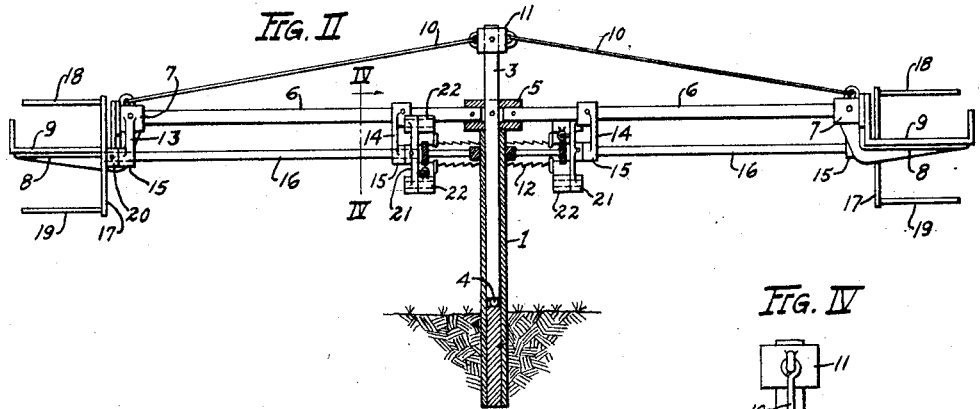
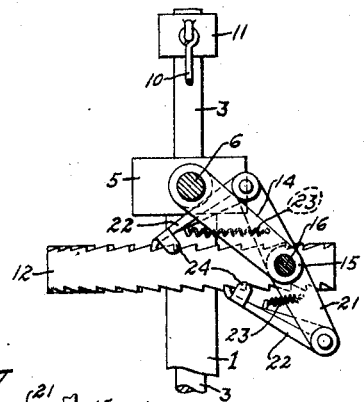
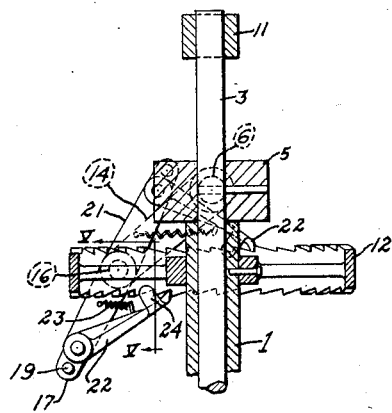
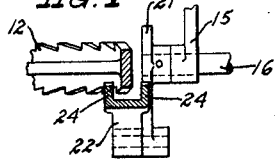
INVENTOR
S. J. SWANSON
By Cook & McCauley
ATTORNEYS Patented May 29, 1928.

1,671,329

UNITED STATES PATENT OFFICE.

SWAN J. SWANSON, OF ST. LOUIS, MISSOURI.

ROTARY AMUSEMENT DEVICE.

Application filed June 11, 1926. Serial No. 115,273.

This invention relates to a rotary amusement device, or roundabout, adapted to be driven by one or more persons riding on the device. One of the objects of the invention is to produce a simple structure of this kind including an operating means that can be easily actuated by a person supported on the rotary structure. More specifically stated, an object is to provide seats for the riders and operating members adapted to be conveniently driven by the occupants of the seats.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claim hereunto appended.

In the preferred form of the invention a handle and a pedal are arranged at the front of a seat, where they can be easily reached by the occupant, and power is transmitted from the handle and pedal to a movable driving member engaging a stationary toothed member near the center of the device. The handle and pedal enable the rider to obtain a secure hold on the revolving structure while using both hands and both feet to effectively transmit the power for the rotary motion. All of the operating elements, excepting the stationary toothed member, travel in a circular course with the rotary carrier.

Fig. I is a top view of a rotary amusement device embodying the features of this invention.

Fig. II is a side elevation with some of the parts shown in section.

Fig. III is a section taken approximately on the line III—III in Fig. I showing elements at the upper portion of the device.

Fig. IV is a section on the line IV—IV in Fig. II.

Fig. V is an enlarged fragmentary section taken approximately on the line V—V in Fig. III.

1 designates a central stationary support comprising a vertical tube containing a rod at its lower end, as shown in Fig. II. This central support is adapted to be securely held at its lower end, and it may be driven into the ground as suggested by Fig. II. 3 designates a vertical shaft rotatably mounted in the tube 1 and resting upon a suitable anti-friction bearing which may be in the form of a ball 4, as shown in Fig. II.

At a point immediately above the tube 1 a collar 5 is fixed to the vertical shaft 3 to receive the inner ends of radial supporting arms 6, the latter being in the form of rods having their inner ends arranged within and fixed to the collar 5. The outer end of each rod 6 is fixed to a collar 7 having an L-shaped extension 8 on which a seat 9 is mounted. The horizontal rods, or arms, 6 are supported partly by the collar 5 and partly by inclined guy rods 10 having their outer ends connected to the collars 7 and their inner ends connected to a collar 11, the latter being fixed to the upper end of the vertical shaft 3.

The operating means includes a stationary ratchet wheel 12 fixed to the stationary tube 1, as shown most clearly in Fig. III, so as to lie concentric with the axis of the vertical shaft 3. I will now describe the elements which cooperate with the ratchet wheel to rotate the elements to which the seats 9 are secured.

13 designates arms extending downwardly from the collars 7, and 14 designates similar arms having their upper ends fixed to the respective rods 6, the lower end of each of said arms being provided with a bearing 15 to receive an oscillatory shaft 16. Each shaft 16 is provided at its outer end with a double arm 17 having a handle 18 at its upper end and a pedal 19 at its lower end. The double arm 17 is provided with a boss 20 which is fixed to the oscillatory shaft 16, and this boss is preferably located about midway between the ends of said arm. The members 18 and 19 may be in the form of rods extending horizontally from the ends of an arm 17. Each set of these elements lies in front of one of the seats 9, so that the occupant of a seat can readily grasp the handle 18 with both hands, while both feet are resting on the pedal 19, the object being to oscillate the shaft 16.

To transmit motion from each shaft 16, the inner end of each of said shafts is provided with a pawl-carrier 21 in the form of a double arm having its middle portion fixed to the shaft 16. Pawls 22 are pivoted to the ends of the double arm 21, as shown most clearly in Fig. IV, the free end of the upper pawl being in contact with a row of teeth at the upper edge of the stationary ratchet wheel 12, while the end of the lower pawl is in contact with teeth at the lower edge of said wheel. Springs 23 connect the pawls to the arm 21, so as to yieldingly force the pawls onto the ratchet teeth. Each can be continuously transmitted. The handle 18 is pulled by the hands when one pawl is in service and the pedal is pushed by the feet when the other pawl is in service. The double pawl devices thus provide a double action mechanism for continuous transmis-